Figure 1:
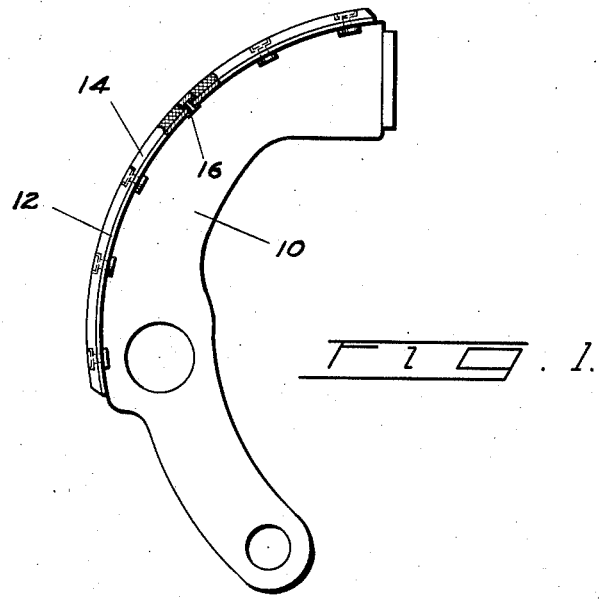

April 10, 1934.  M. M. CUNNINGHAM  1,954,521
BRAKE SHOE
Original Filed Oct. 7, 1929

INVENTOR.
MARION M. CUNNINGHAM
BY *O. H. Fowler*
ATTORNEY.

Patented Apr. 10, 1934

1,954,521

UNITED STATES PATENT OFFICE 1,954,521

BRAKE SHOE

Marion M. Cunningham, South Bend, Ind., assignor to Bendix Aviation Corporation, South Bend, Ind., a corporation of Delaware Original application October 7, 1929, Serial No. 397,795. Divided and this application March 16, 1932, Serial No. 599,290

2 Claims. (Cl. 188—251)

This invention relates to brakes and more particularly to friction elements therefor.

Broadly, the invention comprehends a friction element having attaching means for friction lining including a double diametral hollow rivet. The head of the rivet is seated in the friction lining and its stem passes through a suitable opening in the rim of the friction element and is turned or upset to securely fasten the lining to the friction element. The hollow head of the rivet is filled with a suitable friction material preferably corresponding in coefficient of friction to the lining in which the rivet is embedded.

An object of the invention is to provide means for securing lining to a friction element including a hollow member adapted to be partially filled with friction material.

Another object of the invention is to provide a rivet for securing lining to a friction element having a hollow head for the reception of friction material.

A further object of the invention is to provide a rivet for attaching lining to a friction element having a cup-shaped head of considerably larger diameter than the shank or stem of the rivet which may be seated in a double diametral bore in the friction material and filled with a material of the same coefficient of friction of the lining, so that the lining when attached to the friction element may present an unbroken surface.

A feature of the invention is a hollow double diametral rivet.

Another feature of the invention is a hollow double diametrical rivet having friction material positioned in that portion having the larger diameter.

Figure 2:
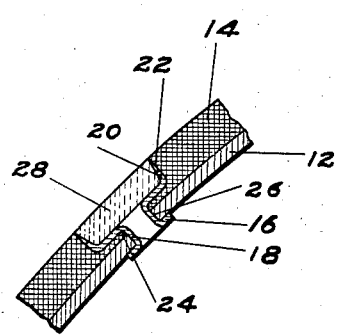

Other objects and features of the invention will appear from the following description taken in connection with the drawing, which forms a part of this specification, and in which:

Figure 1 is a side elevation of a friction element or brake shoe illustrating the invention as applied; and Figure 2 is an enlarged fragmentary sectional view.

Referring to the drawing for more specific details of the invention, 10 represents the web of a friction element or shoe supporting a rim 12 to which is attached a friction lining 14 by means of spaced rivets 16.

As shown, the rivets 16 include a tubular member having two diameters as indicated at 18 and 20. The larger diameter 20 constitutes the head of the rivet and the smaller diameter constitutes the shank or stem of the rivet.

In practice a molded lining of friction material is provided with openings including double diametral bores indicated at 22 and 24. The head of the rivet is seated in the bore 22 with its shank in the bore 24. The shank passes through suitable openings 26 in the friction element or rim of the shoe, and is substantially upset on the inner face of the friction element or shoe, to firmly secure the lining to the rim. The head of the rivet is then filled with a suitable friction material 28 flush with the outer surface of the friction material or lining to present a smooth unbroken surface. The material with which the head is filled has preferably the same coefficient of friction as the lining.

This application is a division of my pending application Serial No. 397,795 filed October 7, 1929, and is made in accordance with requirements of the United States Patent Office under provision of rule 42.

Although this invention has been described in connection with certain specific embodiments, the principles involved are susceptible of numerous other applications that will readily occur to persons skilled in the art. The invention is therefore, to be limited only as indicated by the scope of the appended claims.

Having thus described the various features of the invention, what I claim as new and desire to secure by Letters Patent is:

1. A brake shoe having a friction lining secured thereto by fastenings including a double diametral hollow member partially filled with friction material to give the shoe a substantially continuous friction face.

2. A brake shoe having a friction material on one face which is formed with countersunk rivet openings, rivets securing the friction material to the shoe and having hollow large-diameter portions seated in said openings, and plugs of friction material seated in said hollow portions flush with the outer surface of the friction material and forming with said outer surface a substantially continuous friction face for the shoe.

MARION M. CUNNINGHAM.